United States Patent
Arnold

(10) Patent No.: US 7,919,191 B2
(45) Date of Patent: Apr. 5, 2011

(54) PIGMENTED IMAGES ON STONE

(76) Inventor: George M. Arnold, Greer, SC (US)

( * ) Notice: Subject to any disclaimer, the term of this patent is extended or adjusted under 35 U.S.C. 154(b) by 735 days.

(21) Appl. No.: 11/913,330

(22) PCT Filed: Oct. 19, 2006

(86) PCT No.: PCT/US2006/040947
§ 371 (c)(1),
(2), (4) Date: Nov. 1, 2007

(87) PCT Pub. No.: WO2007/050434
PCT Pub. Date: May 3, 2007

(65) Prior Publication Data
US 2008/0160254 A1    Jul. 3, 2008

Related U.S. Application Data

(60) Provisional application No. 60/729,086, filed on Oct. 21, 2005.

(51) Int. Cl.
*C04B 41/52* (2006.01)
*B05D 3/06* (2006.01)
*B28D 1/00* (2006.01)
*B23K 26/38* (2006.01)

(52) U.S. Cl. ............... 428/542.2; 427/555; 219/121.69

(58) Field of Classification Search .............. 219/121.69, 219/121.79, 121.8, 121.81; 264/400, 482; 427/555; 428/542.2, 15, 542.4, 913.3; 700/166
See application file for complete search history.

(56) References Cited

U.S. PATENT DOCUMENTS

| | | | |
|---|---|---|---|
| 5,341,157 A | 8/1994 | Campagna et al. | |
| 5,554,335 A | 9/1996 | Fields et al. | |
| 6,037,015 A | 3/2000 | dos Santo Simoes et al. | |
| 6,064,034 A * | 5/2000 | Rieck | 219/121.85 |

(Continued)

FOREIGN PATENT DOCUMENTS

DE    2004020029 U1    6/2005

(Continued)

OTHER PUBLICATIONS

International Search Report and Written Opinion under date of mailing of Apr. 2, 2007 in connection with International Patent Application No. PCT/US2006/040947.

*Primary Examiner* — Geoffrey S Evans
(74) *Attorney, Agent, or Firm* — Quarles & Brady LLP

(57) ABSTRACT

A method of creating a pigmented image on a monument stone substrate includes positioning the stone relative to a laser engraving apparatus, masking the stone substrate in an image area in which the image is to be created with a first mask layer, operating the laser engraving apparatus in a pattern over the masked area at a sufficient power level to burn through the mask and pit the stone substrate with a first set of pits, applying a first layer of pigment over the image area to any remaining first mask layer in the image area and to the first set of pits, curing the first layer of pigment and removing any remaining first mask layer. Additional colors or pigment layers can be added by repeating the masking, burning and applying steps, and the final such step can be a dithered image, followed by an edge defining cutting step in which the border of the image is defined. All pigment layers are rooted in the stone. The final pigmented image is preserved with protective coatings.

19 Claims, 5 Drawing Sheets

U.S. PATENT DOCUMENTS

| | | | |
|---|---|---|---|
| 6,300,595 B1 * | 10/2001 | Williams | 219/121.69 |
| 6,813,378 B2 | 11/2004 | Randall et al. | |
| 7,485,237 B2 * | 2/2009 | Guynn et al. | 219/121.69 |
| 2002/0000973 A1 | 1/2002 | Randall et al. | |
| 2004/0137201 A1 * | 7/2004 | Hannan et al. | 264/400 |
| 2004/0197490 A1 * | 10/2004 | Rieck | 427/554 |
| 2006/0172071 A1 | 8/2006 | Marceau et al. | |
| 2006/0210820 A1 * | 9/2006 | Rutstein | 428/542.4 |

FOREIGN PATENT DOCUMENTS

| | | |
|---|---|---|
| EP | 1 063 068 A2 | 9/1996 |

* cited by examiner

PIGMENTED IMAGES ON STONE

CROSS-REFERENCE TO RELATED APPLICATION

This claims the benefit of U.S. Provisional Patent Application No. 60/729,086 filed Oct. 21, 2005.

STATEMENT CONCERNING FEDERALLY SPONSORED RESEARCH OR DEVELOPMENT

Not applicable.

FIELD OF THE INVENTION

This invention relates to producing black and white or color images on natural or synthetic stone substrates such as monuments and headstones.

BACKGROUND OF THE INVENTION

Originally, images were placed on stone (typically a headstone in the cemetery) using a hand-etching tool. This method required using black stone exclusively, as it depends on the contrast of the etched portion of the stone to the polished surface, also requiring the use of polished stone. Grayscale could not be accomplished with this method. Color was added by hand, and would have a limited lifespan of only a few years due to the pigment sitting on the flat surface of the stone. The quality of the image etched into the stone varied with the skill of the engraver.

Modern methods of engraving images on stone improved by utilizing a laser, which blasts away the polished surface, revealing a lighter colored pit on black stone. When these pits are closely aligned and are of sufficient density, they convey a monochromatic image. Lighter colored stone lacks the contrast of black stone, and cannot display an image unless a pigment is incorporated into the engraved pits. Once the excess pigment is removed, the pigmented image is not stable, and cannot endure outdoors for longer than a few years. Sunlight, oxygen, moisture, and acids will deteriorate this pigment in 4-5 years. Additionally, most stone has a "speckle" or "grain" which competes with the image, rendering inconsistent results.

Accordingly, there exists a continuing need to provide images on any stone regardless of color or composition, capable of lasting endurance while utilizing cost effective methods. Our process has addressed these needs with remarkably clear and long lasting images.

SUMMARY OF THE INVENTION

The present invention provides an improved method of engraving images on granites, marbles, and synthetic stones whereby a precisely guided laser beam is used to carry out the engraving process. Commercially available equipment is used to generate a laser beam of high power output and the characteristics of the beam, together with a method of steering the beam to engrave lettering and other graphical images, produces a more realistic and aesthetically pleasing result.

In accordance with one aspect of the present invention, a special tape is used in the process to allow layering of colors, ending with a final dithered image etched on top of an etched and pigmented background, giving a realistic and detailed appearance.

In accordance with another aspect of the invention, a pigmented background allows the utilization of any stone, regardless of speckle, grain, or color.

In accordance with a further aspect of the invention, a multi colored image can be reproduced on stone, thereby giving natural and realistic color images capable of lasting longer than using the prior methods.

The present invention allows the opportunity to apply the pigment on the stone thicker than the prior methods. Pits are etched into the stone with the laser and filled with pigments, creating a ring of stone surrounding a pit filled with pigment. After the thick enamel clear coat is airbrushed on, a final coat of sodium silicate follows, improving the durability of the image. The laser cleanly cuts away the tape and clear coats from the background stone, leaving clean, crisp edges.

The present invention allows for a method of separating colors used to create realistic color images on virtually any type of natural and synthetic stone. The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
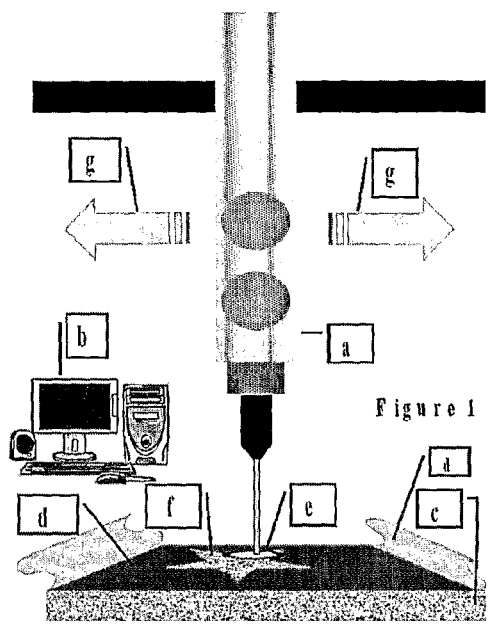
FIG. 1 is front view of a non-enclosed laser engraving system for carrying out an improved laser process in accordance with the invention

FIG. 1 is front view of a 60-watt $CO_2$ non-enclosed laser engraving system for carrying out an improved laser process in accordance with the invention, and in conjunction with the taped stone, will produce a multi-colored image with a final dithered apparent grayscale engraved on top. In FIG. 1 is shown, with paragraph numbers identifying the listed component or element:
  a. Open design $CO_2$ laser engraving machine (such as VYTEK™ Monument Series) with minimum of 60 watts of output power capable of raster and/or vector motion;
  b. Computer with motion controlling software specific to the laser engraver to drive the laser engraver, software for photo-editing (such as ULEAD Photoimpact™), conversion software to convert 8-bit grayscale images to 1-bit black and white images suitable for engraving (such as Photgrav™);
  c. Polished or unpolished natural or synthetic stone of any color such as granite, marble, Silostone™ or slate;
  d. Laser masking tape such as Laseredge™ placed on entire stone surface;
  e. Laser beam of at least 60 watts power output set at 10 inches per second (twice over background area);
  f. Exposed, pitted and vitrified silhouette image area burned away by the laser engraver; and
  g. Laser Rastering Motion (side to side like an inkjet printer with x & y capabilities).

Figure 2:
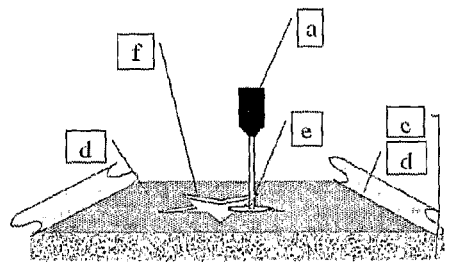
FIG. 2 is a detail perspective view etching the initial background image showing a portion of the laser etching system and taped stone material on a larger scale.

FIG. 2 is a detail perspective view etching the initial background image showing a portion of the laser etching system and taped stone material on a larger scale, illustrating;
  a. Laser engraving machine;
  c. Stone to be etched and engraved;
  d. Laseredge™ masking tape completely covering the surface of the stone;
  e. Laser beam set at 60 watts traveling in raster mode at 10 inches per second (twice); and
  f. Exposed pitted and vitrified silhouette image on stone.

Figure 3:
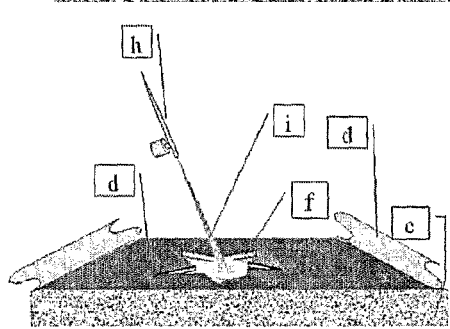
FIG. 3 is a detail perspective view of applying pigment to the engraved stencil and stone.

FIG. 3 is a detail perspective view of applying pigment to the engraved stencil and stone, including;
  c. Stone to be engraved;
  d. Laseredge™ masking tape covering entire surface area of stone except where it has already been engraved;
  f. Exposed pitted and vitrified silhouette image area burned away with laser engraving device;
  h. Airbrush powered with 80-100 psi of compressed air pressure;
  i. Lithichrome™ enamel paint applied with airbrush.

Figure 4:
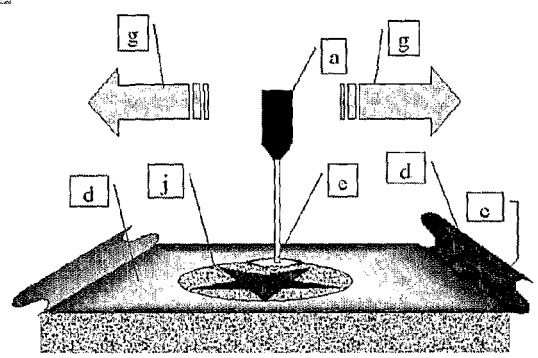
FIG. 4 is a detail perspective view of the second engraving stencil being engraved through newly applied laser tape.

FIG. 4 is a detail perspective view of the second engraving stencil being engraved through newly applied laser tape, including;
  a. Laser engraving device;
  c. retaped stone;
  d. Fresh Laseredge™ tape reapplied to entire stone surface;
  e. Focused laser beam set at 60 watts at 10 inches per second (twice);
  g. Raster motion of laser (Side to side motion); and
  j. New area of image engraved and vitrified prepared for subsequent colors.

Figure 5:
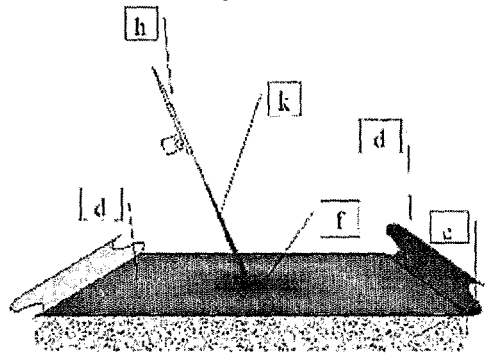
FIG. 5 is a detail perspective view of applying pigment to the new stencil for the subsequent background colors.

FIG. 5 is a detail perspective view of applying pigment to the new stencil for the subsequent background colors. including;
  c. Stone to be engraved;
  d. Laseredge™ tape covering entire surface of stone with secondary color area (outside of star and inside of circle) burned away with laser engraving device;
  f. Silhouette area exposing etched stone second color image to be painted with Lithichrome™ enamel as secondary or subsequent colors;
  h. Air brush propelled with 80-100 psi of air pressure; and
  k. Lithichrome™ enamel is sprayed on exposed secondary image.

Figure 6:
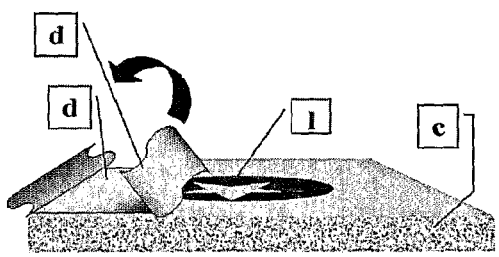
FIG. 6 is a detail perspective view of removing tape to expose subsequent color(s)

FIG. 6 is a detail perspective view of removing tape to expose subsequent color(s), including;
  c. Stone being etched;
  d. Laseredge™ tape removed from stone revealing multi-colored background; and
  l. Multi-colored etched background image.

Figure 7:
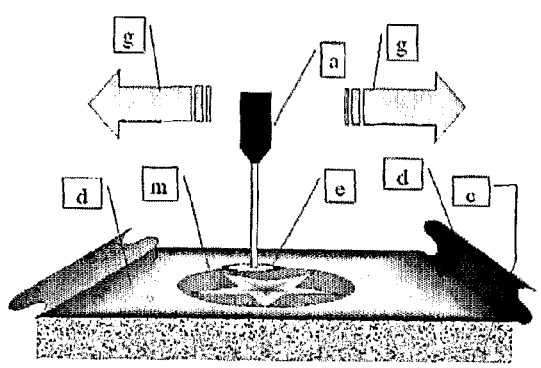
FIG. 7 is a detail perspective view of laser etching the dithered image.

FIG. 7 is a detail perspective view of laser etching the dithered image, including;
  a. Laser engraving device set at 36 watts traveling at 20 inches per second (twice);
  c. Stone to be engraved;
  d. New layer of Laseredge™ masking tape is reapplied to entire surface of stone;
  e. Focused laser beam set at 36 watts traveling at 20 inches per second (twice);
  g. Rastering motion of laser engraver (side to side motion similar to the motion of an inkjet printer) traveling at 20 inches per second; and
  m. Dithered image burned through tape, pigment, and stone. Laser produces a pulse corresponding to the location of a black pixel in 1-bit black and white bitmap file.

Figure 8:
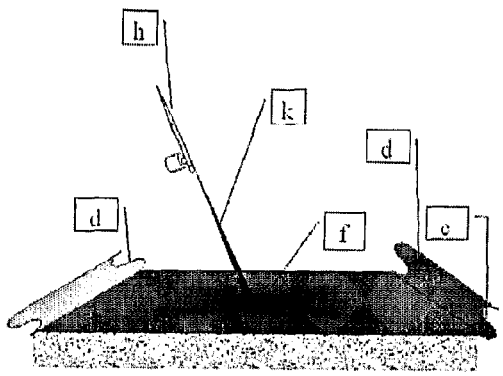
FIG. 8 is a detail perspective view of applying pigment over the dithered image.

FIG. 8 is a detail perspective view of applying pigment over the dithered image, including;
  c. Stone to be etched;
  d. Laseredge™ tape with dithered image burned by the laser through the tape;
  f. Dithered image engraved through tape, background pigment, and stone;
  h. Airbrush propelled with 80-100 psi of compressed air; and
  k. Dark (usually black) Lithichrome™ enamel is applied with airbrush.

Figure 9:
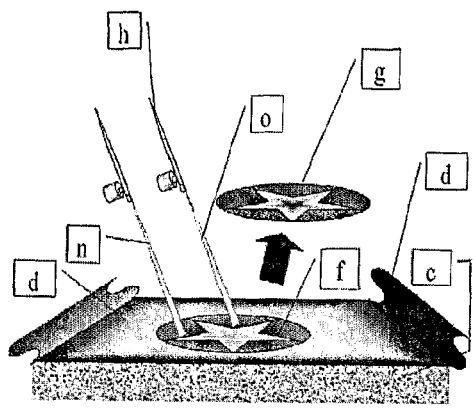
FIG. 9 is a detail perspective view of removing the excess material from the dithered image while leaving the outside stencil in place, then airbrushing a clear coat of enamel, followed by a coat of sodium silicate.

FIG. 9 is a detail perspective view of removing the excess material from the dithered image while leaving the outside stencil in place, then airbrushing a clear coat of enamel, followed by a coat of sodium silicate, including;
  c. Stone to be engraved;
  d. Laseredge™ tape covering entire surface area of stone with painted dithered image;
  f. Single or multi-colored image with contrasting detail dithered image engraved on top;
  g. Excess material removed from image area of stone exposing single or multiple colored background images with detailed dithered image engraved and pigmented on top;
  h. Airbrush using 80-100 psi compressed air;
  o. Clear coats of Lithichrome™ enamel applied to image area for protection; and
  n. Solvent based sodium silicate airbrushed as final protective coat (optional for maximum lifespan).

Figure 10:
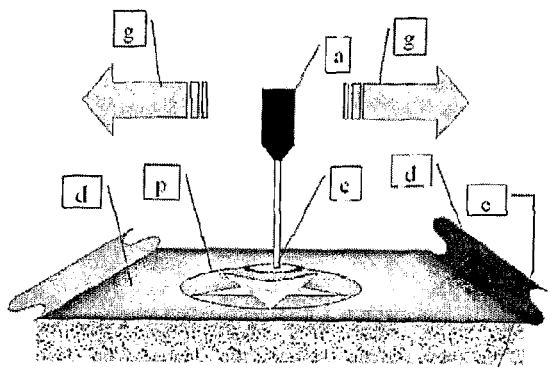
FIG. 10 is a detail perspective view of utilizing the laser to separate the tape and clear coat edges away from the engraved color image.

FIG. 10 is a detail perspective view of utilizing the laser to separate the tape and clear coat edges away from the engraved color image, including;

a. Laser engraving device set at 24 watts traveling at 20 inches per second in raster mode (once);
c. Stone to be engraved;
d. Laseredge™ tape covering entire stone with colored area exposed;
e. Pulsed and focused laser beam set at 24 watts at 20 inches per second (once);
g. Raster motion of laser (side to side) traveling at 20 inches per second; and
p. Outline if image burned away from tape edge, excess pigment, through to the stone creating a separation boundary around the image.

Figure 11:
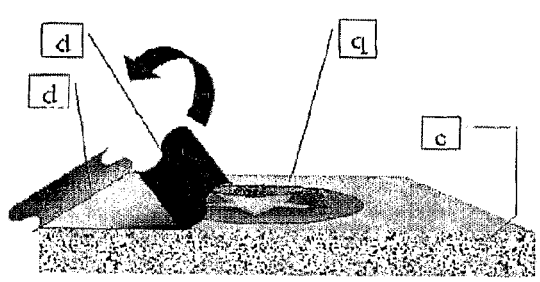
FIG. 11 is a detail perspective view of removing the excess tape and pigment from the surface of the stone, revealing the colored dithered image engraved into the stone.

FIG. 11 is a detail perspective view of removing the excess tape and pigment from the surface of the stone, revealing the colored dithered image engraved into the stone, including;
c. Stone to be engraved;
d. Remaining Laseredge™ tape is removed from stone; and
e. Remaining image etched into stone with Lithichrome™ enamel, clear coat, and sodium silicate protective coating.

Figure 12:
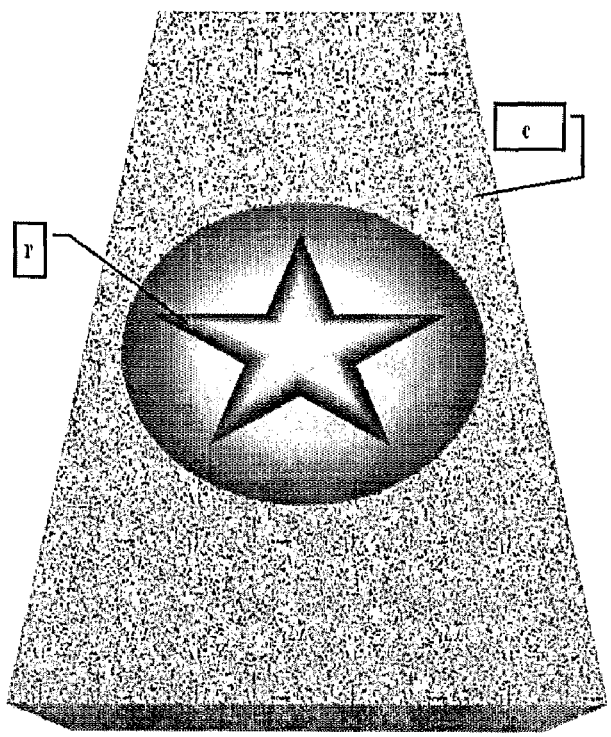
FIG. 12 is a detail perspective view of the final result of the multi-colored image engraved into the light gray (or any color) stone.

FIG. 12 is a detail perspective view of the final result of the multi-colored image engraved into the light gray (or any color) stone, including;
c. Stone following engraving and pigmentation process; and
f. Single or multi-colored image engraved and pigmented into stone with detailed dithered image etched and pigmented on top of single or multi-colored background with protective coating on top.

Figure 13:
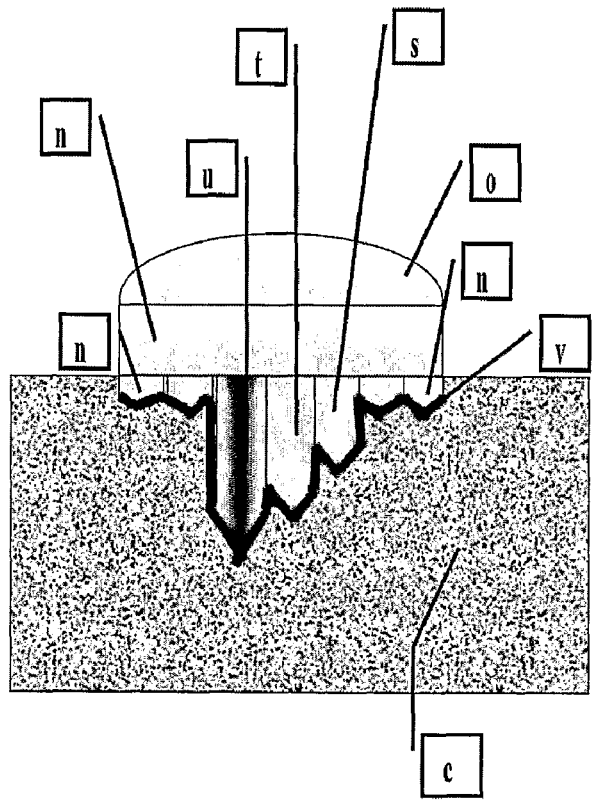
FIG. 13 shows a cross section of the engraved color image with four pit levels (two block colors determined by the number of colors used, a black dithered detail level, and clear coats), and the final coats of clear enamel and sodium silicate.

FIG. 13 shows a cross section of the engraved color image with four pit levels (two block colors determined by the number of colors used, a black dithered detail level, and clear coats), and the final coats of clear enamel and sodium silicate, including;
c. Engraved stone;
n. Clear coat pits filled with clear Lithichrome™ enamel;
o. Sodium silicate topcoat;
s. Secondary color pits with Lithichrome™ pigment impregnated;
t. Primary color pits with Lithichrome™ pigment impregnated;
u. Detailed dithered image showing grayscale gradients; and
v. Glassified stone layer.

Figure 15:
FIG. 15 shows a silhouette background or color 1-bit image.

Materials, Equipment and Software Requirements. The materials needed are laser masking tape (FIG. 1d-11d) (such as Laseredge™ Tape) and paints (FIG. 3i, 5k, 8k, 9n) (such as Lithichrome™ enamel) that are appropriate for application on stone. The equipment required is an open (unenclosed) laser etching system (FIG. 1a. 2a, 4a, 7a, 10a) with power of at least 60 watts connected to a computer. An airbrush painting system (FIG. 3h, 5h, 7h, 9h) connected to an air compressor with an output rating of at least 100 psi is also required. The software requirements (FIG. 1b) are the laser motion control software, photo-editing software, and engraving conversion software, which converts a grayscale bitmap to a black and white dithered bitmap (FIG. 15, 16, 17).

Black and White Imaging. This process is described from the point-of-view of etching a black dithered image on top of a white background although any multi-color image can be produced in this way. The basic operation is to etch and paint the background area first and then etch and paint the dithered detail image on top.

Figure 14:
FIG. 14 shows an 8-bit grayscale image.
Figure 16:
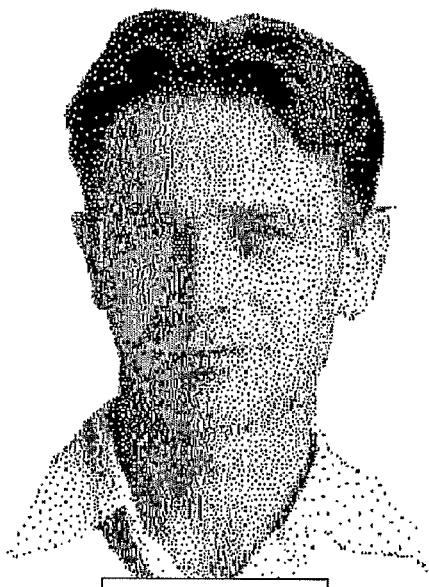
FIG. 16 shows a dithered detail 1-bit image.
Figure 17:
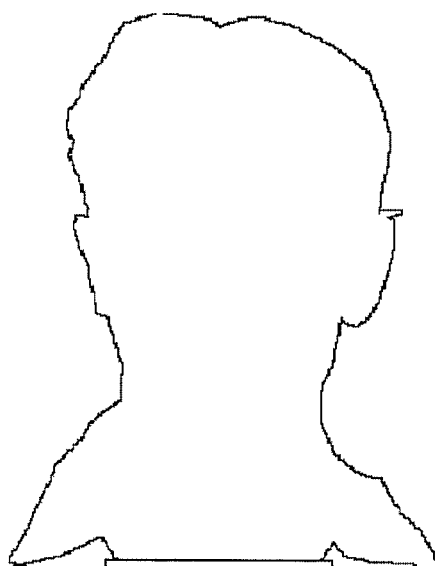
FIG. 17 shows a "cut file" (an outline to be cut around the image)
Figure 18:
FIG. 18 shows a finished image created on light gray granite; this image shows up as grayscale in the drawings, but is a color image on the granite.

Preparation of the Image. Using Photo-Editing Software, the Photograph is edited so as to only contain those portions of the picture that are to be reproduced. Any other image editing is also done at this time and the final image is converted to an eight-bit grayscale image (FIG. 14). A silhouette version of the image is created and then converted into a one-bit black and white bitmap with no dithering (FIG. 15). This, too, is done with the editing software. The grayscale image is next converted to a one-bit black and white dithered bitmap using appropriate conversion software (such as Photgrav™) (FIG. 16). The silhouette image is also used to prepare a file consisting only of a cut around the edge of the silhouette region (FIG. 17). This will be used to assist in cleanly removing all of the masking tape after the final protective coating (FIG. 10). This cut file can be either a raster or a vector file, depending on the best capabilities of the system. If prepared properly, the dithered image, the silhouette image and the cut image will all line up exactly.

Preparation of the stone. Lithichrome™ enamel paint (FIG. 3i, 5k, 8k) will be applied to the stone (FIG. 1c-13c) and since lighter stone has a tendency to stain, it is necessary to mask off the entire area that will receive the image. Laser masking tape such as Laseredge™ tape (FIG. 1d-11d) is applied to the area before each of the background and dithered images are run.

Operation of the laser. Once the stone (FIG. 1c-13c) is aligned in the laser and taped, the background silhouette image (FIG. 1f, 2f, 3f, 15) is engraved with the laser (FIG. 1e, 2e). Settings for this use high power and slow speed. Lasers with a power of less than 60 watts are unable to etch the stone deeply enough for proper paint adhesion. For a 60-watt $CO_2$ laser it is recommended to raster etch (FIG. 1g) the silhouette twice at 100% power (60 watts) and 10 inches per second. The stone is not moved and is painted (FIG. 3) in place in the laser system before running the dithered image (FIG. 7m, 16). This cannot be done on an enclosed system since the laser equipment cannot be sufficiently shielded from the paint spray. When etching the dithered image (FIG. 7, 16) it is necessary to use lower power and somewhat faster speed otherwise the image can be ruined. With a 60-watt laser the recommended settings are 60% power (36 watts) and 20 inches per second speed twice. After applying the clear protective coating (FIG. 9n, 9o), the edge cut is run (FIG. 10, 17). Power and speed vary according to the type of file (raster or vector) and the machine capabilities. Using a raster file for a 60-watt $CO_2$ laser the recommended settings are 20 watts at 20 inches per second.

Application of the pigment. After running the silhouette image (FIG. 1f, 2f), the stone is left in place and the area is brushed and blown clean with compressed air. White paint (or other background color) is applied by an airbrush in several layers and allowed to dry completely (FIG. 3). The region is masked again with laser tape and the laser restarted with either the next color level (FIG. 4,5,6), or the dithered image being etched. After etching the dithered image (FIG. 7), the stone is left in place and the area again brushed and blown clean. Black paint (or other color) is applied by an airbrush in several layers and allowed to dry completely (FIG. 8). The image is cleaned up with the removal of all tape residues inside the image, leaving the tape around the outside area only (FIG. 9f). For maximum protection and lifespan of the image several layers of a clear protectant/sealant are applied then allowed to dry completely (FIG. 9n). Finally, a layer of sodium silicate is applied to the image providing a UV resistant coating capable of maximum longevity (FIG. 9o). The outline cut is run and all remaining masking material is removed (FIG. 10, 11).

Each time the laser fires over an area, a deeper pit is produced, with the final dithered detail file etching the deepest pits. These pits are vitrified into the stone, and will form the pits to which the pigments and clear coat will adhere. The deeper the pit, the longer the image will last.

Color Imaging

Preparation of the Image. A Good Image Reproduction Engraved into Stone Starts with acquiring the highest quality image possible. This image is scanned or downloaded into a photo editing software program (such as ULEAD Photoimpact™), and the image is edited as much as needed. The image is then saved as a grayscale bitmap, then converted to a 1-bit bitmap through another software program.

Determination of Color Scheme

Different images require varying methods to produce the best results. The first step is to determine the color scheme and type of image. A black and white image (with dithered grayscale) is relatively simple. Only three files are required (background, dithered, and cut), only black and white pigments are employed, and only a single or double taping effort is required.

A "clip art" type image can have its colors easily separated. Virtually all computerized photo editing and drawing software programs (such as ULEAD Photoimpact™) are capable of posterizing and separating colors effectively, and separate 1-bit files can be generated for each discrete color. Each color will require a separate session with the laser engraving device, masking with laser tape between each run of the laser until the total number of colors selected equal the number of files run. The tape is removed after every run, and replaced between each engraving of the 1-bit files. After every run with the laser, long lasting pigments are applied with an airbrush. The preferred method for removing excess tape and paint from granites and hard marble is with a razor blade.

A colored photographic image can be engraved into stone using one of three techniques. The first method is basically identical to the process described above, except flesh tones are produced by engraving the background image into the stone, and varying the pigment tint within the masked area that has been etched through the laser tape with light and dark pigments. Other block colors are separated, and a 1-bit file is created for each base color. After each of these blocks are taped and painted, the black dithered image file will be etched on top of the colored segments, rendering a realistic appearance.

The second method requires producing separate files from a "posterized" image, using the readily available photo editing or drawing programs. The levels of "posterization" must be set at the lowest value where acceptable results are achieved. Each layer from the posterized file will correspond to a certain hue and tint, and a separate 1-bit file will be used for each color, and engraved separately. As above, each etched layer requires taping the stone, applying the various selected hues and pigments, and removal of the excess tape and pigment for each 1-bit file. If a final black dithered detail file is added as the final layer, a highly detailed colored photographic image is produced. The next layer is a protective coat of clear enamel, and finally, a coat of sodium silicate capable of greatly improving the lifespan of the image.

The final method employs the utilization of a 16-bit color separation program, available on most photo-editing software programs. A palette is loaded into the program based on the RGB values of scanned pigment colors used. These colors on the electronic palette will be identical to the pigments utilized during the painting process. The photographic file will be rendered into a 16-bit file. Each color is captured discretely, and a 1-bit file is produced for every color in the palette. Each of these files are engraved as above, with a tape mask being used between etched images.

Appropriate color pigments are applied with an airbrush, and excess material is removed between color levels. If black is omitted from the color palette, a final black "dithered" image will be used as the detail layer, and is the final pigmented layer applied. As with all the described methods, a thick protective clear coat is applied followed by a suggested layer of sodium silicate as the final coat to promote longevity.

The final result is a clear photo-quality image with great detail etched into any color or type of stone, capable of greater longevity than with conventional methods.

Preparation of the Stone

Different stones require slightly different preparation. First, the stone must be cleaned, and stripped of waxes, oils, lime buildup and dirt. It should also be dry throughout.

For all types of stone, a background is etched deeply into the stone through laser tape, and then airbrushed pigments are applied to the etched image. The excess tape and pigment are removed, leaving a thick layer of pigment in the etched area. Subsequent layers will be repeated until the total numbers of color levels are achieved. Good ventilation is required when burning through tape, pigment and stone.

When the stone is placed under the laser, great care must be taken to insure the stone is level and correctly lined up and oriented to the travel direction of the laser. The stone must not be allowed to move until it is completed. Additionally, it is important to mask off non-pigmented areas with newspaper, masking tape, latex, or laser tape to minimize over-spray. Excess material can be removed with a razor blade.

Finally, when the stone is completed, the pigments should be given adequate time to dry. Generally, 24 to 48 hours is sufficient.

Synopsis of Process

1. Select Stone—This method can engrave an image on any kind of natural or synthetic stone, whether polished or not such as granite, marble, Silostone™, used as a headstone, outdoor sign, or kitchen or bathroom countertop decoration (FIG. 1c-13c).
2. Prepare stone—Clean all traces of dirt, oil, wax, and grease from stone with water, alcohol, or solvent. Stone must be thoroughly dry to proceed.
3. Place stone in laser engraving machine such as VYTEK™ monument series laser engraver. Laser engraver must be equipped with a laser capable of producing a 60-watt beam, and be constructed with an open design (FIG. 1a, 1b). Stone must be straight and level.
4. Tape stone with Laseredge™ masking tape over the entire stone (FIG. 1d).
5. Prepare image file to be engraved using the following steps:
   a. Select highest quality image available with particular attention placed on wide contrast range, good clarity and resolution.
   b. Using a photo-editing software program such as ULEAD Photo Impact™, or Adobe Photoshop™, image is either imported from any graphic file, or scanned into an electronic format as a color or black and white graphic file. The physical size of the file must be the same size as the final engraved image.
   c. After editing and touchup, an object outline is electronically created around the area of the image to be etched onto the stone. This object will be used to create 3 files—a solid silhouette file (FIG. 15), a dithered detail file (FIG. 16), and an outline cut file (FIG. 17).

d. The silhouette file is created by selecting the outlined object in the electronic image, and darkening the object until it is completely black. This file is converted from a color or grayscale file (FIG. 14) to a 1-bit black & white bitmap file (no grayscale, either black or white) (FIG. 15, 16, 17). The black pixels in this file will correspond to where the laser emits a pulse of coherent focused light, creating a pit in the surface of the stone where it strikes.

e. The dithered detail file (FIG. 16) is created by selecting the outlined object then copying this into a separate 8-bit grayscale format. This file is converted to a 1-bit dithered detail file by using an engraving conversion software such as Photograv™ Each black pixel will correspond to the area where the laser-engraving machine will pulse a coherent focused beam of light, producing a pit in the stone.

f. If multi-colored image is desired, each color is separated using the same method described in 5d, and each color is separated in a solid block, to be converted to a 1-bit image with the silhouette of the desired color (FIG. 15). Each color will be made into a separate 1-bit file. This can be accomplished easily by posterizing the initial image and separating the file by color level using the photo-editing software.

g. To produce a highly detailed color image, each color is isolated by using a 16-bit color separation function found in the photo-editing software, and producing a separate 1-bit file for each color.

h. A file consisting of the outline of the various combined silhouette files is produced in a 1-bit format. This will be the "cut file" which will cut the finished image from the excess tape and paint (FIG. 17).

6. Engrave the stone—Using the laser-etching device such as a VYTEK™ monument series system equipped with a minimum 60 watt $CO_2$ laser, the background silhouette image is engraved through the tape into the stone (FIG. 1-2). For each background color etched, the laser speed is set to 10 inches per second at 60 watts twice. The image is now burned through the tape into the stone creating glassified pits etched into the stone (FIG. 13v).

7. Paint the base coat—The accumulated dust from the engraving process is blown away with compressed air. The base coat of paint (usually white) consists of Lithichrome™ enamel applied with an airbrush using 80 to 100 psi of compressed air. The silhouette image is cut away from the laser masking tape and paint using the prepared cut file. The remaining tape is removed from the stone. It is important to use enough air pressure to drive the pigment into the engraved pits in the stone (FIG. 3).

8. Multi-Colored Images—The various color field background colors are applied repeating steps 6 & 7 for each color field. The entire surface of the stone is completely taped with the Laseredge™ tape after each color is done. Ample time must be allowed for each color to dry completely (FIG. 4, 5, 6).

9. Dithered Detail Image—Once again, the entire stone is taped making sure there are no air bubbles trapped under the tape. The dithered detail file is engraved on top of the taped silhouette color images at a speed of 20 inches per second at a power setting of 36 watts twice. When the image has been engraved, the entire surface is cleaned with compressed air, and painted with black Lithichrome™ pigment. The cut file for the entire image is laser engraved at a speed of 20 inches per second at a power setting of 24 watts is run to cut a boundary around the detailed dithered image. The excess material from the inside of the image is removed by pulling out the larger sections by hand, and removing the residue by scraping the image area with a razor blade held at a 90 degree angle to the stone (FIG. 7, 8, 9).

10. Clear Protective Coats—Clear Lithichrome™ is applied abundantly on the exposed image followed by a coat of solvent based sodium silicate, sprayed with an airbrush. Once the protective coats have dried, they are cut away with the laser set at 24 watts at 20 inches per second from the tape and protective coat over-spray. The excess tape is now removed with the engraved image remaining on the stone. Allow image to dry for 24 hours (FIG. 9, 10, 11).

Image has been sealed on the underside with a glassification or vitrification of the stone (FIG. 13v). The pigment has been impregnated into the stone in successive levels, with the dark dithered detail color achieving the deepest levels, and the clear-coat at the shallowest level, with the color levels in the middle. A ring of stone envelopes each "pit" of pigment, thereby allowing the protection of the stone around the pigment (FIG. 13).

This process produces colored detailed images on any color stone, regardless of being polished or rough, and capable of lasting longer than current methods achieve (FIG. 12).

SUMMARY

Computer programs and hardware for controlling lasers in stone etching are well known but were only used in the prior art on black stone, as the contrast was not sufficient on other color stones. In the prior art method, stone to be engraved was placed under the laser and the laser operated, under control of the computer, to produce the image in the stone. The pits were quite shallow in comparison to the present invention since the laser was operated at a low setting. This produces a dithered image made of shallow pits that are lighter in color than the surrounding black stone. The image was considered of generally good quality, but when the stone got wet, like in a rain storm, the water would darken the pits, reducing the contrast and sometimes making the image almost invisible. Sometimes the manufacturer would spray paint over the pits with white paint to fill the pits with the paint. The excess paint on the stone surface around the pits would be scraped off. The white paint would stay white when wet but this process was quite limited in the images it could produce, was not capable of producing color images, required black stone, and lacked durability in comparison to the present invention.

The invention provides a method of producing durable, long lasting black and white or color images on polished or unpolished natural or synthetic stone substrates of any color. In a method of the invention, the stone surface on which the image is to be placed is masked with a tape or other masking material that is capable of being vaporized with a laser. The masked surface is then engraved with the laser, which pits the stone surface and vaporizes the tape according to the position and on/off times of the laser, which is under control of a computer. The engraved area is then cleaned and painted and the paint is cured, for example with a silhouette or other base or background color of pigment. One or more additional coats of another image or color can be applied over the background by applying a fresh layer of mask and engraving the image through the mask, already existing pigment and into the stone substrate. The pre-existing mask layer can be removed or not prior to this step. This can be done for different colors, color areas or for dithered images. Each color in general requires masking and engraving. After engraving but before the masking is removed, the color is applied. Layers are built up until the image is finished, usually including a dithered image as the final image forming layer. The image is then sealed with one or more clear coat layers and could be sealed with a sodium silicate layer.

In the invention, the pigment that produces the image is protected on three sides by the stone. The surface of the stone that is pitted is glassified by the laser, which helps to seal the surface and prevent moisture migrating from the back side of the image from adversely affecting the image. Since the image is below the surrounding surface of the stone, the sides of the image are protected by the stone from the elements. In addition, each color of the image preferably extends all of the way down to the stone, so that there are no pigment to pigment interfaces between the stone and the visible surface of the image, to further enhance the longevity of the image and its resistance to the elements.

To glassify the surface, the laser is operated at a relatively high power relative to prior art methods. For example, in the preferred method, the laser is operated at least 60 watts at 10 inches per second. The result is that the laser at least partially glassifies or partially melts the surface to an extent so as to seal the back side of the image, which has beneficial effects for the subsequently applied image.

Use of the laser engravable masking, known for being used to laser etch glass, also has beneficial effects when used in the invention to apply images to stone. The masking, which is typically plastic, is vaporized by the laser as the laser engraves the stone. The masking, which may be applied directly over the stone or one or more layers of pigment that have already been applied to the stone, shields surrounding areas from overspray when the pigment is applied, preferably using a spray type of application under sufficient pressure to drive the pigment down into the pores or pits that have been formed in the stone. The pigment conforms to the shape of the pits and tightly adheres to the stone so the image tightly adheres to the stone.

The background can be a single color, or can be multiple colors. If multiple colors are used, the colors of the image to be produced will have to be separated, either by posterization, 16 bit color separation or another method of color separation, and each different color to be used will require a separate masking and laser etching process, preferably all of the way down to the stone in the areas or points at which the color is to be applied. Each color may be applied over a whole area, or as a dithered image. After application of each pigment and curing, the excess masking and pigment is cleaned off of the image area.

The final application of cleaning/masking/etching/pigment application may be a dithered detail image. The image is converted to a 1-bit dithered detail file, and each black pixel corresponds to an area where the laser will be pulsed to vaporize the masking and any pigment under the masking, and produce a pit in the stone. The dithered detail pigment is then applied and cured.

After the image is created, one or more protective coatings are preferably applied. These may be one or more clear coats compatible with the pigments used, that may be sprayed or brushed on. A final coat may be a sodium silicate coat, to produce a glassy protective coating.

When all of the pigments and coatings have been applied and cured, the laser is operated around the outline of the image, to cut the pigments and coatings from the surrounding masking, pigments and coatings. This creates a clean and sharp line of separation.

Thus, the invention provides a method for engraving high quality black and white or color images on any color or type of natural or synthetic polished or rough stone. A commercially available $CO_2$ non-enclosed laser engraving apparatus having at least 60 watts of power with a movable beam capable of operating in raster mode can be used. The laser beam is caused to be traversed over the stone along a predetermined path. The stone is covered with tape capable of vaporization under the path of the laser beam thereby creating a stencil at the same time that the stone is etched. The image in an electronic format is converted to a 1-bit black and white dithered image which is translated to control the laser to fire at specific X & Y locations on the stone. The stone is first engraved with a background image with the $CO_2$ laser set at for example about 60 watts at 10 inches per second twice through a layer of the laser masking tape until sufficient depth is achieved. By "about", plus or minus 10% is intended to be included. The engraved background in then cleaned with compressed air, and Lithichrome™ pigment is applied with an airbrush. The tape is then removed leaving a colored background engraved into the stone. Tape is then reapplied and one or more dithered images are laser engraved on top of the pigmented engraved background through the laser masking tape with the laser engraver set at 36 watts at 20 inches per second and this is repeated, so the laser is operated twice in succession. The masked, engraved stone is again cleaned and then painted with different colored pigments such as Lithichrome™ sprayed through an airbrush with 60-100 psi of pressure and allowing adequate drying time. Excess paint is removed from inside the stencil using a razor blade at a right angle to the surface of the stone so as not to scrape off the desired paint surface of the image. The image is then protectively coated with a clear coat protective sealant, which may include sodium silicate, and is cut from the surrounding materials such as masking, pigment and clear coat with the laser set at 20 watts at 20 inches per second once. The boundary tape is then removed, revealing the image surrounded by stone.

Other important features and advantages include producing high quality color images on natural or synthetic stone; providing a non-enclosed $CO_2$ laser engraving apparatus comprised of a minimum of 60 watts with a movable beam capable of operating in raster mode; causing said laser beam to be traversed over natural or synthetic stone along a predetermined path; covering the stone with tape capable of vaporization under path of a laser beam; converting an image into an electronic format, separating different color levels, converting each level to a separate 1-bit file; converting the final image to a 1-bit black and white dithered image; translating a 1-bit image to correspond to a command to pulse fire the laser at a specific X & Y location on the selected material; engraving a background image with the $CO_2$ laser set at 60 watts at 10 inches per second twice through a layer of special laser masking tape twice or until sufficient depth is achieved; cleaning the engraved background with compressed air, then applying pigment with airbrush; removing tape leaving a colored background engraved into the stone; repeating steps above for each color level required; reapplying tape and laser engrave dithered 1-bit final image on top of the pigmented engraved background through the laser masking tape; painting the masked stone with different colored pigments such as Lithichrome™ sprayed through an airbrush with 60-100 psi of pressure and allowing adequate drying time; removing excess paint using razor blade; coating image with clear coat protective sealant; cuffing image from paint and tape with laser set at 20 watts at 20 inches per second; removing boundary tape, revealing image surrounded by stone; coating the image with sodium silicate; creating a 1-bit file comprising only the outline of the image; cutting the image from the excess paint and tape with laser set at 30 watts at 20 inches per second in raster mode to provide clean edge and release; and removing the boundary tape, revealing the image engraved in stone.

Thus, computer-driven laser etching technology revolutionized the monument, granite countertop, and outdoor signage industries by introducing the ability to precisely etch images on stone. The current process is limited in its use by the necessity to use only black (or very dark) polished stone. In the standard process, when the laser fires it creates tiny pits on the surface of the stone. These pits show up lighter than the surrounding polished area and thus creates a white-on-black image on the stone. Different computer programs exist that translate a gray-scale digital photograph into a one-bit image consisting of discrete black and white pixels. Motion controlling software (specific to the laser system) drives the laser back and forth in a rastering motion over the surface of the stone being etched and the laser fires at the locations determined by the black pixels. This leaves a light image on the dark stone. This process has not been successfully used on lighter stone because of the lack of contrast between the polished surface and the laser-etched image. Similarly, an alternative method involves hand etching, rendering a result dependent on the skill of the person engraving, and colorization with this process lasts a relatively short period of time.

In the present invention, the laser is used to precisely determine the location of the various pigments and pit the stone at those locations. Long lasting pigments are applied into the stone, in the appropriate order so as to render a photographic quality image on a flat stone of any color.

Utilizing a laser of sufficient power, permanent images can be engraved on to any color granite, marble, or man-made stone with amazing clarity and resolution. This process can also be used to put color images on granite, marble, and man made stone of any color. This process produces superior images to the traditional engraved images only utilizing black stone. The present process allows a long and durable lifespan for these images when exposed to outdoor conditions such as sunlight, acids, moisture, and oxidation.

Preferred embodiments of the invention have been described in considerable detail. Many modifications and variations to the preferred embodiments described will be apparent to those skilled in the art. Therefore, the invention should not be limited to the embodiments described, but should be defined by the claims which follow.

I claim:

1. A method of creating a pigmented image on a stone substrate comprising the steps of:
   positioning the stone substrate relative to a laser engraving apparatus;
   masking the stone substrate in an image area in which the image is to be created with a first mask layer;
   operating the laser engraving apparatus in a pattern over the masked area at a sufficient power level to burn through the mask and vitrify the stone substrate to thereby form a first set of vitrified pits in the stone substrate;
   applying a first layer of pigmented paint over the image area to any remaining first mask layer in the image area and to the first set of vitrified pits;
   curing the first layer of pigmented paint;
   removing any remaining first mask layer.

2. A method as in claim 1, including the step of translating the image to correspond to a command to pulse fire the laser at a specific X & Y location on the stone substrate, the image having at most one bit per pixel.

3. A method as in claim 1, wherein the laser is operated at a power level of at least 60 watts.

4. A method as in claim 1, further comprising the steps of repeating the masking, laser operating, pigmented paint applying and curing steps for each color of pigmented paint to be applied.

5. A method as in claim 1, further comprising the step of cleaning off the image area of any excess masking material.

6. A method as in claim 1, further comprising the steps of:
   applying a second mask layer over the image area;
   operating the laser engraving apparatus in a pattern over the masked area at a sufficient power level to burn through the second mask layer, any of the first mask layer, the first layer of pigmented paint in the path of the laser, and vitrify the stone substrate to thereby form a second set of vitrified pits in the stone substrate;
   applying a second layer of pigmented paint over any remaining second mask layer in the image area and to the second set of vitrified pits;
   curing the second layer of pigmented paint; and
   removing any remaining second mask layer.

7. A method as in claim 6, wherein the second layer of pigmented paint is applied at least partially over the first layer of pigmented paint.

8. A method as in claim 6, wherein at least one of the sets of vitrified pits is in the shape of a dithered image.

9. A method as in claim 8, wherein each successive operation of the laser over an already existing vitrified pit in the stone substrate creates a deeper vitrified pit.

10. A method as in claim 1, including the step of converting an image into an electronic format, separating different color levels and converting each level to a separate file that is used to control the laser engraving apparatus, the file having at most one bit per pixel.

11. A method as in claim 1, including the step of converting an image to a black and white dithered image that is used to control the laser engraving apparatus, the black and white dithered image having at most one bit per pixel.

12. A method of creating a pigmented image on a stone substrate comprising the steps of:
    positioning the stone substrate relative to a laser engraving apparatus;
    masking the stone substrate in an image area in which the image is to be created with a first mask layer;
    operating the laser engraving apparatus in a pattern over the masked area at a sufficient power level to burn through the mask and pit the stone substrate with a first set of pits;
    applying a first layer of pigment over the image area to any remaining first mask layer in the image area and to the first set of pits;
    curing the first layer of pigment;
    removing any remaining first mask layer;
    applying a second mask layer over the image area;
    operating the laser engraving apparatus in a pattern over the masked area at a sufficient power level to burn through the second mask layer and any of the first mask layer and the first layer of pigment in the path of the laser and pit the stone substrate with a second set of pits;
    applying a second layer of pigment over any remaining second mask layer in the image area and to the second set of pits;
    curing the second layer of pigment;
    removing any remaining second mask layer;
    wherein at least one of the sets of pits is in the shape of a dithered image; and further comprising the step of covering the image with at least one clear protective coat.

13. A method as in claim 12, wherein the clear protective coat contains sodium silicate.

14. A method as in claim 12, further comprising the step of operating the laser in a cut pattern to separate the image from surrounding materials.

15. A method as in claim 14, wherein the laser is operated in the cut pattern so as to pit the stone less than when operating the laser engraving apparatus in the pattern over the masked area.

16. A pigmented image on stone, comprising at least two layers of pigment applied to a pitted surface of the stone, wherein both layers are in contact with bottoms of pits in the stone, and one layer is between the other layer and the pitted surface of the stone, and the other layer extends through the one layer in the area of the pits that the other layer contacts, and wherein the pits that are in contact with the one layer that is between the other layer and the pitted surface of the stone are more shallow than the pits that are in contact with the other layer.

17. A method of creating an image on a stone substrate using a laser engraving apparatus including a laser emitter, the method comprising the steps of:
 converting an image file of the image to a dithered image file having at most one bit per pixel;
 positioning the stone substrate relative to the laser engraving apparatus;
 masking the stone substrate with a mask layer over an image area in which the image is to be created;
 moving the laser emitter to a plurality of locations relative to the stone substrate based on information from the dithered image file;
 operating the laser emitter at each of the plurality of locations at a sufficient power level to burn through the mask layer and glassify the stone substrate to thereby form at least one glassified pit in the stone substrate;
 applying a layer of pigment over the image area to any remaining portions of the mask layer in the image area and to the glassified pits;
 curing the layer of pigment; and
 removing any remaining portions of the mask layer.

18. A method as in claim 17, further comprising the steps of:
 converting the image file to a silhouette image file having at most one bit per pixel;
 masking the stone substrate with another mask layer over the image area;
 moving the laser emitter to another plurality of locations relative to the stone substrate based on information from the silhouette image file;
 operating the laser emitter at each of the other plurality of locations at a sufficient power level to burn through the other mask layer and glassify the stone substrate to thereby form at least one of another set of glassified pits in the stone substrate;
 applying another layer of pigment over the image area to any remaining portions of the other mask layer in the image area and to the other set of glassified pits;
 curing the other layer of pigment; and
 removing any remaining portions of the other mask layer.

19. A method as in claim 18, wherein the other layer of pigment is a non-black and a non-white color.

* * * * *